United States Patent [19]
Tsumura et al.

[11] Patent Number: 6,022,702
[45] Date of Patent: *Feb. 8, 2000

[54] PROCESS FOR PRODUCING A SOY PROTEIN HYDROLYSATE

[75] Inventors: Kazunobu Tsumura; Wataru Kugimiya; Kumiko Hoshino, all of Ibaraki, Japan

[73] Assignee: Fuji Oil Company Limited, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/828,393

[22] Filed: Mar. 27, 1997

[30] Foreign Application Priority Data

Mar. 28, 1996 [JP] Japan ................................ 8-074433

[51] Int. Cl.$^7$ ............................ C12P 21/06; C07K 1/00; A23L 1/20
[52] U.S. Cl. ............................ 435/68.1; 435/272; 426/46
[58] Field of Search .............................. 426/46; 435/272, 435/68.1

[56] References Cited

U.S. PATENT DOCUMENTS

| | | | |
|---|---|---|---|
| 2,502,482 | 4/1950 | Sair et al. | |
| 3,843,802 | 10/1974 | Puski | 426/46 |
| 4,409,248 | 10/1983 | Lehnhardt et al. | 426/46 |
| 4,632,903 | 12/1986 | Boyce et al. | 435/69 |

FOREIGN PATENT DOCUMENTS 2184519  12/1973  France .

OTHER PUBLICATIONS

De Reu et al., "Protein hydrolysis during soybean tempe fermentation with Rhizopus oligosporus", J. Agric. Food Chem. 43 (8) : 2235–2239 (1995).

Morita et al., "A serine protease in soybean sed that acts specfically on the native alpha subunit of beta–conglycinin", Plant Cell Phys. 35 (7) : 1049–1056 1994).

Domoroshchenkova et al., "Modified proteins for health and common food products", Proceed. world conf. oilseed tech. util. (1993), pp. 416–419.

"Manufacture Protein Decompose Product Comprise Hydrolysis Vegetable Protein Enzyme Fractionate", Database WPI Section Ch, Week 8542, Derwent Publications Ltd., London, GB, Class D13, An 85–261149 & JP 60 176 549 A (Nisshin Oil Mills Ltd.) Sep. 10, 1985 (Abstract).

Lee et al., "Studies on enzymatic partial hydrolysis of soybean protein isolates", FSTA AN 85–4–04–g0105 & Korean Journal of Food Science and Technology, vol. 16, No. 2.

Fuji Oil Co., Ltd., "Production of Nongelatinized Soybean Protein", Patent Abstracts of Japan, vol. 12, No. 103 (C–485), Apr. 5, 1988 & JP 62 232341 A Oct. 12, 1987 (Abstract).

Primary Examiner—Sandra E. Saucier
Attorney, Agent, or Firm—Fish & Richardson P.C.

[57] ABSTRACT

The present invention provides a soy protein hydrolysate with a low content of glycinin wherein glycinin as a major component in soybean protein is selectively decomposed and a process for producing the same. The soy protein hydrolysate with a low content glycinin is obtained by allowing a proteolytic enzyme to act on soy protein to selectively decompose glycinin in the soybean protein, and the process for producing a soy protein hydrolysate with a low content of glycinin comprises allowing a proteolytic enzyme to act on soy protein at pH 1.0 to 2.8, preferably pH 1.5 to 2.5.

12 Claims, 1 Drawing Sheet

Lane No. 1: Control group in Example 1 (control)
Lane No. 2: Example 2 (pH 2.0)
Lane No. 3: Example 1 (pH 2.5)
Lane No. 4: Example 3 (pH 2.8)
Lane No. 5: Comparative Example 1 (pH 3.5)
Lane No. 6: Comparative Example 2 (pH 2.5, after thermal denaturation)

PROCESS FOR PRODUCING A SOY PROTEIN HYDROLYSATE

FIELD OF THE INVENTION

The present invention relates to a protein hydrolysate with a lowered content of a specific constituent protein, especially a soy protein hydrolysate with a low content of glycinin wherein glycinin as a major component in soybean protein is selectively decomposed as well as to a process for producing the same.

BACKGROUND OF THE INVENTION

A soybean contains a large amount of high-quality proteins and has been utilized as an excellent protein source from old times. In particular, soy protein isolate is useful as a food material by virtue of its high protein content and various functional characteristics such as emulsification properties, gelation properties, water holding properties etc.

The soybean protein is composed of various proteins of complicated higher-order structure which are classified into 2S, 7S, 11S and 15S proteins etc. based on e.g. ultracentrifuge sedimentation rates, and these proteins have different characteristics even in physical properties.

For example, the soy protein isolate obtained by acid-precipitating soy milk extracted from de-fatted soy flakes with water consists essentially of 7S globulin (mainly β-conglycinin) and 11S globulin (mainly glycinin), and each component has inherent functional characteristics. However, these components are present in the form of their mixture and thus the inherent functional characteristics of each component cannot sufficiently be utilized in practical use.

Therefore, many attempts have been made to fractionate each component in order to utilize its inherent functions. For example, there are studies and reports of Wolf et al. and Thanh et al. on experimental fractionation, and proposals have been made in Japanese Patent LOP Publication Nos. 56843/1973, 31843/1974, 86149/1976, 124457/1980, 153562/1980, 64755/1981, 132844/1982 and 36345/1983. However, these prior methods are still in the experimental stage and are not suitable for industrial fractionation.

Under these circumstances, it is proposed in Japanese Patent LOP Publication 187755/1986 that soybean protein components can be fractionated in an industrial separation method using pH and temperature regulation in the presence of sulfite etc., but troublesome pH and temperature controls are essential in this method.

There are also many investigations for functional improvements by use of proteolytic hydrolysis with proteases. For example, Japanese Patent Publication No. 24262/1973, Japanese Patent Publication No. 1028/1980, Japanese Patent LOP Publication No. 232341/1987, Japanese Patent Publication No. 14941/1992 etc. are concerned with such improvements, but all these methods are related to functional modifications such as in solubility, non-gelation properties etc. by preceding thermal denaturation of soybean protein for promotion of hydrolysis prior to enzymatic reaction, and there are no attempts at functional modifications such as decomposition of only a specific component in soybean protein.

It is often hard for an native form of protein including soybean protein to undergo decomposition with a hydrolytic enzyme such as protease (S. S. Nielsen et al., J. Agric. Food. Chem., 36, 869 (1988)), and thus protein denaturation by heating, alcohol etc. is common practice prior to proteolytic hydrolysis.

The soy protein isolate is a mixture consisting essentially of 7S globulin (mainly β-conglycinin) and 11S globulin (mainly glycinin) as stated above, and it is known that there is a difference between the components in degree of denaturation caused under the same conditions. For example, it is known that 11S globulin is denatured easier at acidic pH than 7S globulin (I. Koshiyama, J. Sci. Fd Agric., 23, 853 (1972)), and also that 7S globulin is denatured by heating at a lower temperature than 11S globulin (S. Damodaran, J. Agric, Food Chem., 36, 262 (1988)).

In the method for enzymatic decomposition up to now, however, it was not possible to specifically and exclusively decompose a specific component in soybean protein, possibly due to uncontrollable protein denaturation treatments, such as excessive heating, alcohol treatment etc. prior to proteolytic hydrolysis.

If it is possible to decompose exclusively specific components in soybean protein, a soybean protein having inherent functional characteristics could be obtained from a mixture of the respective components.

SUMMARY OF THE INVENTION

Under these circumstances, the object of the present invention is to provide a protein hydrolysate with a lowered content of a specific constituent protein, especially a soy protein hydrolysate with a low content of glycinin wherein glycinin as a major component in soybean protein is selectively decomposed and a process for producing the same.

As a result of their extensive research, the present inventors directed their attention to the fact that glycinin and β-conglycinin as major components in soybean protein have different degrees of denaturation at specific acidic pH, and they found that a soy protein hydrolysate with glycinin selectively decomposed can be obtained by allowing a proteolytic enzyme to act at this pH, to arrive at the present invention.

That is, the present invention is a process for producing a protein hydrolysate with a low content of a specific constituent protein, in which a proteolytic enzyme is allowed to act on a proteinous material containing a plurality of proteins to selectively decompose the specific constituent protein.

The action of said proteolytic enzyme on the proteinous material containing a plurality of proteins is effected under conditions in which the specific constituent protein has been selectively denatured, and the denaturation conditions are based on pH adjustment and/or temperature adjustment.

In the protein hydrolysate with a low content of a specific constituent protein, the degree of decomposition of the specific protein is 60% or more, preferably 80% or more, and the degree of decomposition of major constituent proteins other than the specific constituent protein is 40% or less, preferably 20% or less.

Further, the present invention is a process for producing a soy protein hydrolysate with a low content of a specific constituent protein, in which a proteolytic enzyme is allowed to act on soybean protein to selectively decompose a specific constituent protein in the soybean protein.

As a specific constituent protein in the soybean protein, mention is made of glycinin. The action of said proteolytic enzyme on soybean protein is effected at pH 1.0 to 2.8, preferably pH 1.5 to 2.5.

As another specific constituent protein in the soybean protein, mention is made of β-conglycinin. In this case, the action of said proteolytic enzyme on soybean protein is effected at a temperature of more than 50° C. to less than 90° C., preferably 55 to 85° C., more preferably 60 to 80° C.

Furthermore, the present invention is a soy protein hydrolysate with a low content of β-conglycinin, wherein the glycinin/β-conglycinin ratio is 1.5 or more, preferably 2.5 or more, more preferably 3.0 or more, and the ratio of trichloroacetic acid-soluble protein to the whole protein is 5 to 20% by weight.

DETAILED DESCRIPTION OF THE INVENTION

Figure 1:
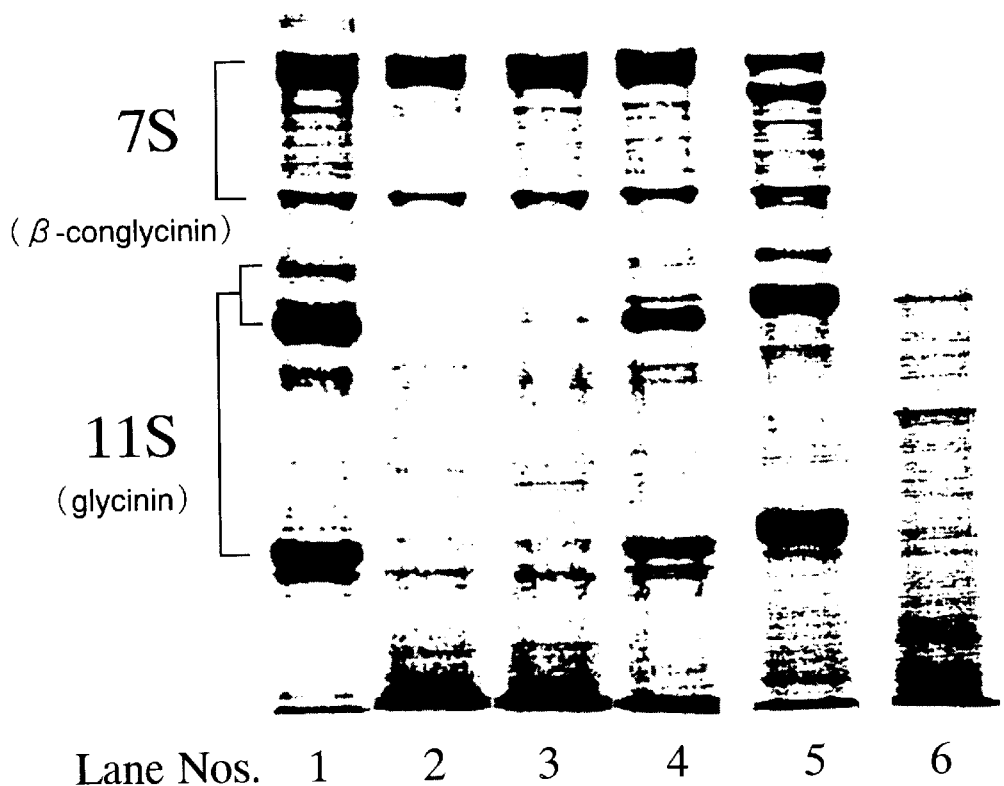
FIG. 1 shows a profile in SDS-electrophoresis.

Hereinafter, the present invention is described in detail.

The soybean protein used in the present invention includes soybeans, dehulled soybeans and whole-fat soy milk based on soybean protein, de-fatted soy milk, concentrated soy protein, soy protein isolate etc., preferably a processed product of soybean protein subjected to processing treatment not accompanied by protein denaturation, and the variety and producing district of the starting soybeans are not limited. Generally, a preferable starting material is de-fatted soy flake subjected to low-temperature extraction treatment with n-hexane as extraction solvent, and low-denatured de-fatted soy flakes with NSI (nitrogen solubility index) of 60 or more, preferably 80 or more, are particularly preferable. As water extracts from such low-denatured de-fatted soy flakes, de-fatted soy milk, concentrated soy protein and soy protein isolate are used preferably in the present invention.

It is necessary that the proteolytic enzyme used in the present invention is an enzyme preparation having proteolytic hydrolysis activity at pH 1.0 to 2.8. These may be commercially available enzyme preparations derived from plants, animal organs or microorganisms, and their origin is not particularly limited, and pepsin is most preferably used.

To carry out the present invention, the proteolytic enzyme is added to soybean protein in the process of manufacturing soybean protein in which glycinin is selectively decomposed with the enzyme at pH 1.0 to 2.8. In the manufacturing of soy protein isolate, for example, low-denatured de-fatted soy flakes are extracted with water to be separated into a water-insoluble fraction (bean curd lees) and a water-soluble fraction (soy milk), and this water-soluble fraction is subjected to isoelectric precipitation to be separated further into a water-insoluble fraction (curd) and a water-soluble fraction (whey), and this acid-precipitated curd is suspended in water, then adjusted to pH 1.0–2.8 and subjected to hydrolysis reaction. Then, the reactant is neutralized, sterilized and dried as a product. Alternatively, the reactant may be subjected to acid precipitation at pH 4.8 or thereabout, that is the isoelectric point of β-conglycinin, then separated by centrifugation into a supernatant (mainly a hydrolysate of glycinin) and a precipitate (mainly β-conglycinin not decomposed), and both of them may be neutralized, sterilized and dried as products.

Usually, the enzyme reaction can be carried out after adjusting an aqueous suspension containing intact soybean protein to pH 1.0–2.8 and then adding a proteolytic enzyme to it in the range of 0.001 to 0.5%, preferably 0.01 to 0.1% based on the solid content in said aqueous suspension. The reaction temperature is generally in the range of 20 to 50° C., preferably 30 to 40° C. The reaction is carried out generally for 5 minutes to 2 hours, preferably 10 to 30 minutes. Continuous treatment is also feasible by passing the aqueous suspension through a column packed with an immobilized enzyme.

The soybean protein after enzymatic hydrolysis is separated into its components by SDS-electrophoresis and stained with Coomassie Blue. The density of each band thus stained can be used to evaluate the change of each component in the soybean protein. According to the present invention, there can be easily obtained a soy protein hydrolysate with a low content of glycinin wherein the degree of decomposition of glycinin is 60% or more, preferably 80% or more, and the degree of decomposition of β-conglycinin is 40% or less, preferably 20% or less, in other words the content of glycinin is 40% or less of the starting soybeans, preferably 20% or less, and the content of β-conglycinin is 60% or more of the starting soybeans, preferably 80% or more.

The soy protein hydrolysate with a low content of glycinin obtained in this manner can be utilized effectively as a food material to make full use of the functions of β-conglycinin.

EXAMPLES

Hereinafter, the present invention are described in detail by reference to Examples, which however are not intended to limit the scope of the present invention.

Example 1

To 100 g low-denatured de-fatted soy flakes (nitrogen solubility index: NSI>80) obtained using n-hexane as extraction solvent was added 10-fold excess of water, and the suspensions were extracted at room temperature and pH 7 for 1 hour and then centrifuged to give 950 g de-fatted soy milk. 950 g of the de-fatted soy milk was adjusted to pH 4.5 with hydrochloric acid and then centrifuged to remove the whey fraction and 100 g acid-precipitated curd was thus obtained. 100 g of the acid-precipitated curd was suspended in water and then adjusted to pH 2.5 with hydrochloric acid. Pepsin (Sigma) was added to the aqueous suspension in an amount of 0.05% based on the solid content of said suspension, and enzyme reaction was carried at 37° C. for 30 minutes. The enzyme reactant was neutralized with sodium hydroxide, and the solution was heated at 140° C. for 15 seconds and spray-dried to give 37 g soy protein (test group). As a control group, the acid-precipitated curd was suspended in water, then neutralized with sodium hydroxide, heated at 140° C. for 15 seconds and spray-dried (control group).

10 μg each sample of the test group and control group was separated by SDS-electrophoresis and the density of each band stained with Coomassie Blue was examined with a densitometer. Table 1 shows the degrees of reduction of glycinin and β-conglycinin in the test group, as compared with those (as 100%) of the control group. The results indicate that nearly the whole of glycinin in the soybean protein was selectively decomposed.

Example 2

An acid-precipitated curd prepared in the same manner as in Example 1 was suspended in water, and the aqueous suspension was adjusted to pH 2.0 with hydrochloric acid, and pepsin (Sigma) was added in an amount of 0.05% based on the solid content of the suspension, and enzyme reaction was carried at 37° C. for 30 minutes. The enzyme reactant was neutralized with sodium hydroxide, and the solution was heated at 140° C. for 15 seconds and spray-dried to prepare soy protein.

Example 3

An acid-precipitated curd prepared in the same manner as in Example 1 was suspended in water, and the aqueous suspension was adjusted to pH 2.8 with hydrochloric acid, and pepsin (Sigma) was added in an amount of 0.05% based on the solid content of the suspension, and enzyme reaction was carried at 37° C. for 30 minutes. The enzyme reactant was neutralized with sodium hydroxide, and the solution was heated at 140° C. for 15 seconds and spray-dried to prepare soy protein.

Comparative Example 1

An acid-precipitated curd prepared in the same manner as in Example 1 was suspended in water, and the aqueous suspension was adjusted to pH 3.5 with hydrochloric acid, and pepsin (Sigma) was added in an amount of 0.05% based on the solid content of the suspension, and enzyme reaction was carried at 37° C. for 30 minutes. The enzyme reactant was neutralized with sodium hydroxide, and the solution was heated at 140° C. for 15 seconds and spray-dried to prepare soy protein.

Comparative Example 2

De-fatted soy flake milk prepared in the same manner as in Example 1 was heated at 90° C. for 30 minutes and an acid-precipitated curd was prepared from it. The curd was suspended in water, and the aqueous suspension was adjusted to pH 2.5 with hydrochloric acid, and pepsin (Sigma) was added in an amount of 0.05% based on the solid content of the suspension, and enzyme reaction was carried at 37° C. for 30 minutes. The enzyme reactant was neutralized with sodium hydroxide, and the solution was heated at 140° C. for 15 seconds and spray-dried to prepare soy protein.

10 µg each of the samples in Examples 2 and 3 and Comparative Examples 1 and 2 was separated by SDS-PAGE and the density of each band stained with Coomassie Blue was examined with a densitometer. The degrees of reduction of glycinin and β-conglycinin in each sample were determined in comparison with the glycinin and β-conglycinin contents (as 100%) in the control group in Example 1. The results are shown in Table 1. As can be seen from the results in Comparative Examples 1 and 2, the decomposition of glycinin and β-conglycinin hardly occurs at pH 2.8 or more, whereas the decomposition of both glycinin and β-conglycinin occurs if subjected to excessive thermal denaturation prior to enzyme reaction, and it is thus not possible to obtain a selectively decomposed product.

TABLE 1

| Reaction pH | Reduction of Glycinin (%) | Reduction of β-Conglycinin (%) | |
|---|---|---|---|
| pH 2.5 | 96 | 4 | Example 1 |
| pH 2.0 | 98 | 15 | Example 2 |
| pH 2.8 | 65 | 2 | Example 3 |
| pH 3.5 | 8 | 2 | Com. Ex. 1 |
| pH 2.5 (after thermal denaturation) | 96 | 94 | Com. Ex. 2 |

Com. Ex.: Comparative Example

EFFECT OF THE INVENTION

According to the present invention, a soy protein with a low content of glycinin with glycinin selectively decomposed can be obtained easily, and the resulting soy protein can be applied widely to various food industries such as meat manufacturing, marine product manufacturing, drinks etc., thus highly contributing to improvements in industry.

What is claimed is:

1. A process for producing a soy protein hydrolysate with a low content of glycinin comprising:

obtaining from low-denatured de-fatted soy flakes, having a nitrogen solubility index (NSI) of 60 or more, a soybean protein isolate comprising glycinin and β-conglycinin without thermal denaturization;

contacting an aqueous suspension of the isolate with pepsin at a concentration of about 0.001% to about 0.5% by weight of the isolate in the suspension at a pH in the range from about 1.0 to about 2.8 and at a temperature in the range from about 20° C. to about 50° C. to obtain a soy protein hydrolysate; and neutralizing the hydrolysate, whereby the degree of decomposition of glycinin is 60% or more and that of β-conglycinin is 40% or less.

2. The process according to claim 1, wherein the pH is in the range from about 1.5 to about 2.5.

3. The process according to claim 1, wherein the contacting is for a duration of about 5 minutes to about 2 hours.

4. The process according to claim 3, wherein the duration is about 10 minutes to about 30 minutes.

5. The process according to claim 1, wherein the degree of decomposition of glycinin is 65% or more and that of β-conglycinin is 15% or less.

6. The process according to claim 1, wherein the degree of decomposition of glycinin is 96% or more and that of β-conglycinin is 15% or less.

7. The process of claim 1, wherein the isolate is obtained by acid precipitation of the soy flakes at a pH of about 4.5.

8. The process of claim 1, wherein the low-denatured de-fatted soy flakes have an NSI of 80 or more.

9. A process for producing a soy protein hydrolysate with a low content of β-conglycinin comprising:

obtaining from low-denatured de-fatted soy flakes, having a nitrogen solubility index (NSI) of 60 or more, a soybean protein isolate comprising β-conglycinin and glycinin without thermal denaturization;

contacting an aqueous suspension of the isolate with pepsin at a concentration of about 0.001% to about 0.5% by weight of the isolate in the suspension at an acidic pH, and at a temperature in the range from more than 50° C. to less than 90° C., whereby the ratio of glycinin to β-conglycinin is 1.5 or more by weight, and the ratio of trichloroacetic acid soluble protein to the whole protein is from about 5% to 20% by weight in the pepsin treated product.

10. The process according to claim 9, wherein the temperature is in the range from about 60° C. to about 80° C.

11. The process according to claim 9, wherein the ratio of glycinin to β-conglycinin is 1.5 or more, and the ratio of trichloroacetic acid soluble protein to the whole protein is from about 5% to 20% by weight.

12. The process of claim 9, wherein the low-denatured de-fatted soy flakes have an NSI of 80 or more.

* * * * *